United States Patent
Mahant-Shetti et al.

(10) Patent No.: US 6,370,191 B1
(45) Date of Patent: Apr. 9, 2002

(54) EFFICIENT IMPLEMENTATION OF ERROR APPROXIMATION IN BLIND EQUALIZATION OF DATA COMMUNICATIONS

(75) Inventors: Shivaling S. Mahant-Shetti, Karnataka (IN); Srinath Hosur, Plano; Alan Gatherer, Richardson, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/431,687

(22) Filed: Nov. 1, 1999

(51) Int. Cl.⁷ .............................. H04L 27/10
(52) U.S. Cl. .................. 375/233; 375/350; 708/300; 708/323
(58) Field of Search ................. 375/229, 230, 375/231, 233, 234, 235, 350, 222, 227; 708/300, 305, 322, 323

(56) References Cited

U.S. PATENT DOCUMENTS 4,553,260 A * 11/1985 Belt et al. ..................... 382/22
5,603,112 A * 2/1997 Gabato et al. ............. 455/226.2
5,862,068 A * 1/1999 Onodera ....................... 364/752
6,081,822 A * 7/2000 Hillery et al. ............... 708/445

* cited by examiner

Primary Examiner—Stephen Chin
Assistant Examiner—Dac V. Ha
(74) Attorney, Agent, or Firm—J. Dennis Moore; W. James Brady, III; Frederick J. Telecky, Jr.

(57) ABSTRACT

A cable modem (20) having a blind equalizer (40) in its equalization function (28) is disclosed. The blind equalizer (40) includes an adaptive equalizer (44) and an approximating update function (42) that provides updated equalization coefficients to the adaptive equalizer (44) using the Constant Modulus Algorithm, wherein the error in the adaptive equalizer output is estimated. The estimates are based upon a determination of the maximum and minimum of the real and i components of symbols output by the adaptive equalizer (44). Efficiency in the computations required for updating the equalizer coefficients is obtained, without sacrificing convergence.

14 Claims, 5 Drawing Sheets

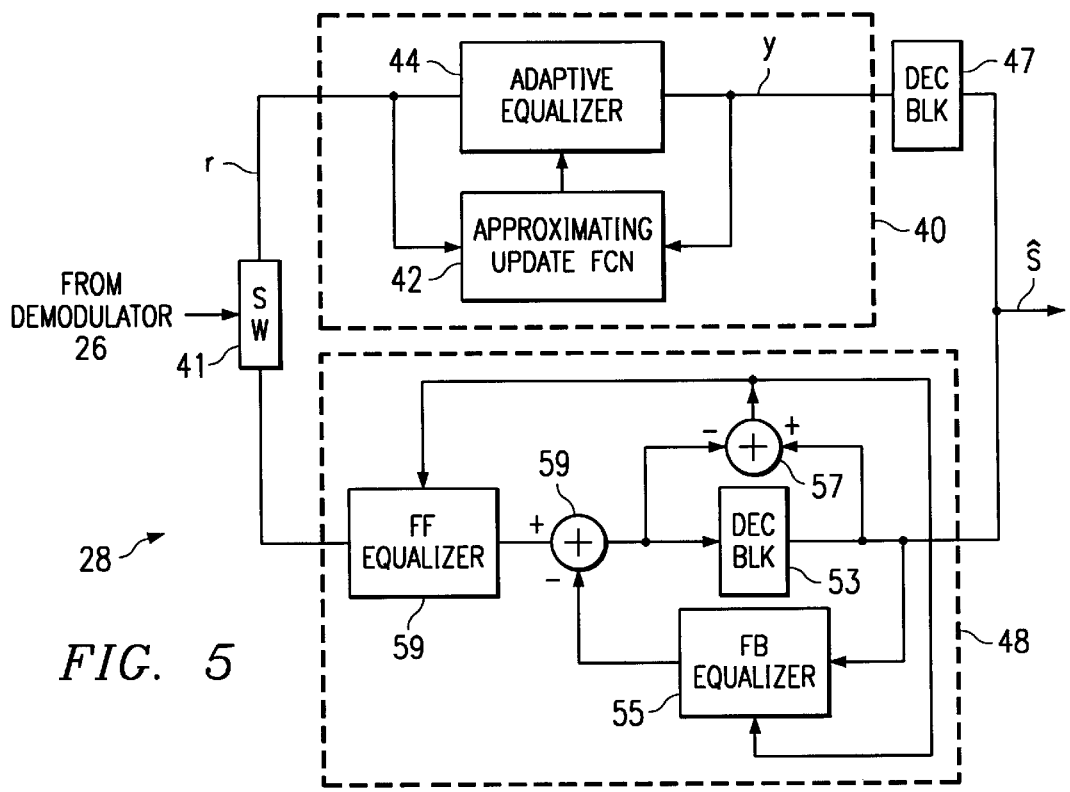
FIG. 5
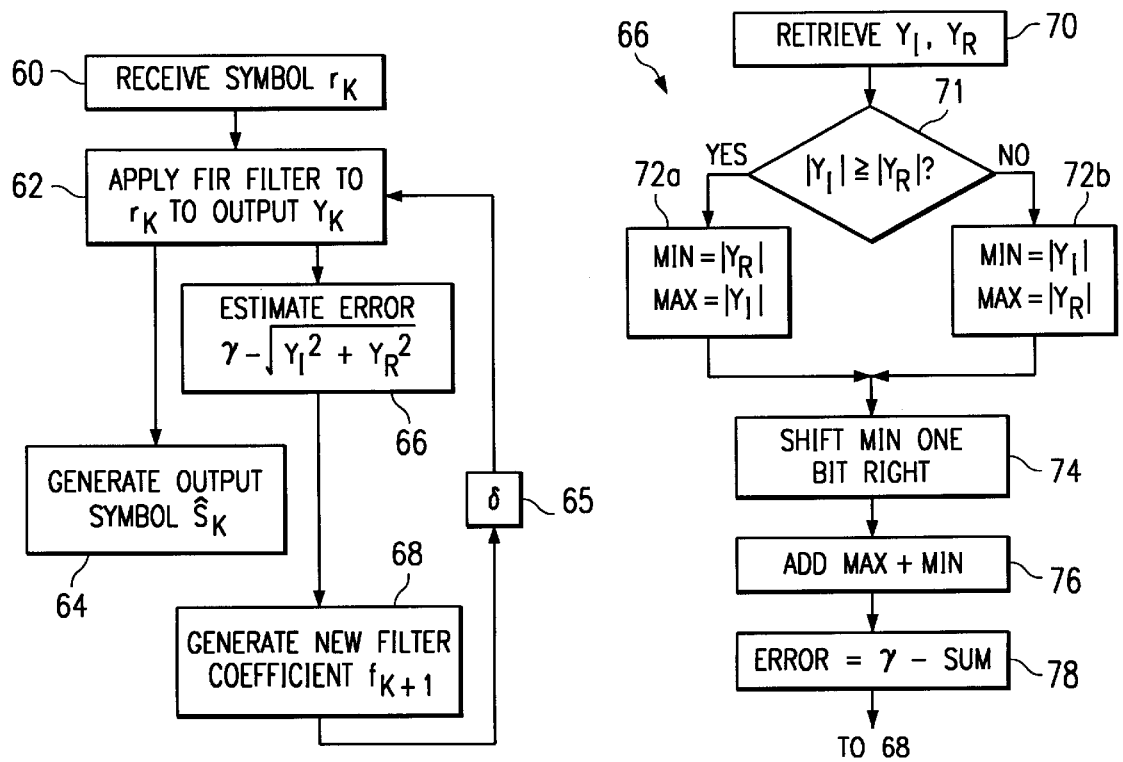
FIG. 6
FIG. 7a

EFFICIENT IMPLEMENTATION OF ERROR APPROXIMATION IN BLIND EQUALIZATION OF DATA COMMUNICATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of data communication, and is more particularly directed to equalization techniques in modem communications.

Data communication among computers and terminals is now commonplace. Much of this communication traffic is carried out by way of modulated signals transmitted and received over existing communications facilities, such as the Public Switched Telephone Network (PSTN) and existing cable television (CATV) networks. The modulation and demodulation of these signals are generally carried out by way of modulator/demodulators ("modems"), residing as system functions in many personal computers, workstations, palm-size computers, and other devices that perform data communications over these communications facilities. As is fundamental in the art, a modem is a device or system function that converts signals to be communicated over the telephone network from a digital bitstream generated by its host computer into an analog signal within the voice band, and vice versa, permitting data communications to be readily carried out over the same telephone network as other communications, such as voice or television programming.

The frequency response of the path, or channel, over which a given modem communication session is carried out is far from ideal, causing the transmitted signal is significantly distorted by its transmission over the channel. Such distortion can give rise to effects such as intersymbol interference ("ISI"), which prevents the receiving modem from accurately distinguishing adjacent received data symbols from one another. Because the channel frequency response varies widely from location to location, it is not feasible to define signal processing characteristics such as data rate, sub-channel frequencies, and signal filtering a priori; rather, the particular frequency characteristics of a communications channel are specifically measured and compensated within each modem communications session.

One common approach for deriving the appropriate channel compensation utilizes the transmission of a known "training sequence" of data from one location to a receiving modem (the string sequence being "known" by the receiving modem). The receiving modem demodulates and decodes the training sequence as received from the transmitting modem, determines the nature of any error between the received training sequence and the known sequence, and sets various filter parameters accordingly, thus compensating for frequency-dependent distortion that is presented by the communications channel. These parameters may also be communicated to the transmitting modem, if appropriate, for use in its own compensation of return traffic (or for pre-compensation of the transmitted signal, if desired).

However, in certain situations, a known training sequence is not available for use by the modem in establishing communication. One such situation is the use of the cable television (CATV) network as the medium of communication, particularly in the provision of Internet access to homes. The attractive features of the CATV network include the relatively large installed base of homes having cable television service, and also the inherently high data rates that may be carried by the coaxial cable with which cable television programs are delivered, especially when compared with twisted-pair copper wiring commonly used in telephone service. Data communication along the CATV network typically consists of multiple user modems connected to a headend, which is a cable company office from which the CATV programming is forwarded to the cable subscribers. The transmission medium in a CATV network is typically coaxial cable, or a combination of coaxial cable and fiber optic links, giving rise to the so-called Hybrid Fiber Coax (HFC) infrastructure. Modems at the user locations can also establish dial-up connections with the headend in the CATV network, for example to access the Internet, in which case signals are bidirectionally communicated, rather than simply unidirectionally communicated as in the distribution of television programming. However, according to conventional protocols for the establishment of communications sessions using cable modems, no training sequences are communicated between the headend and the user modems.

Even if training sequences are not to be used, the appropriate filter parameters must still be determined in order for data communications to be carried out at a reasonable data rate. Absent the training sequences, the equalization parameters must be determined, and updated, from the transmitted data itself. One conventional type of equalizer that is useful for this operation is referred to as the decision feedback equalizer, or "DFE". In a typical DFE, the received digital signal is processed by an equalizer, such as may be implemented by a finite impulse response (FIR) filter, and forwarded to a decision block which presents a "decision" about the value of the filtered symbol. The output of the decision is applied to an update function that implements an adaptation algorithm for updating the equalizer coefficients (in the FIR realization, these parameter will be the "taps" along the digital delay line) in response to a comparison between the decision output and the signal applied to the equalizer. Over time, the equalizer coefficients converge upon the appropriate channel compensation. However, because decision feedback equalization depends upon reasonable accuracy of the decision process, the equalizer coefficients may never converge if the intersymbol interference is significant. To address this issue, a process referred to in the art as "blind equalization" can be performed by a receiving modem to coarsely define the appropriate filter parameters for use in later transmissions. Blind equalization does not utilize any assumptions about the actual data transmitted, but rather relies upon statistical properties of the transmitted data in order to set the equalization coefficients. Specifically, the update, or adaptation, performed in blind equalization compares the input and output of the equalizer FIR to one another, and updates the FIR by minimizing a cost function based upon the desired statistics.

Typically, blind equalization is used as an initial process in order to remove ISI and other distortion to such an extent that other equalization techniques, such as DFE, may then be applied. An example of such a combination equalization technique is schematically illustrated for a conventional cable modem in FIG. 1. As illustrated therein, signal s(t) is applied to communications channel 2, and communicated to a modem which receives the signal r(t). Signal r(t) thus corresponds to the transmitted signal, as distorted by channel 2; in the time domain, $r(t)=h(t) * s(t)$, where $h(t)$ is the response of channel 2 and where * is the convolution operator. Typically, the analog signal $r(t)$ is sampled upon receipt by an analog-to-digital converter (ADC) (not shown), which generates a digital sample stream $r_k$. Blind equalizer function 3 receives the sample stream $r_k$ at its adaptive equalizer function 4. Adaptive equalizer function 4 applies a digital filter, such as an FIR, to the received sample stream $r_k$. The equalization coefficients applied by equalizer function 4 are defined according to an initial default state that is updated by update function 6. The output of adaptive equalizer function 4 is a signal $y_k$, which is applied to update function 6 along with the received sample stream $r_k$. Decision block 7 also receives the output of adaptive equalizer 4, determines the symbol value therefrom, and forwards detected symbols $\hat{s}_k$ to the remainder of the modem.

Decision feedback equalizer (DFE) function 8 is in parallel with blind equalizer function 2. In the conventional manner, DFE function 8 includes feed-forward equalizer 9 that applies a compensating filter, also generally an FIR filter, to the received signal $r_k$. The output of feed-forward equalizer 9 is applied to adder 11, which also receives the output of feedback equalizer 15. Adder 11 applies the difference in these inputs to decision block 13, which determines the detected symbol therefrom and forwards detected symbols $\hat{s}_k$ to the remainder of the modem, and to the input of feedback equalizer 15. The combination of feedback equalizer 15 and feed-forward equalizer 9 implements the appropriate compensation for channel 2. In this conventional arrangement, the equalizer coefficients of feedback equalizer 15 and feed-forward equalizer 9 are updated by adder 17, which compares the input to and output from decision block 13 to generate a difference that is used to adapt the coefficients of equalizers 9, 15.

In this conventional arrangement, blind equalizer function 3 operates during the initial portion of the transmission, with the filter parameters (or "taps", in the digital filter sense) of adaptive equalizer function 4 being set to coarsely compensate for the distortion effects (i.e., response $h(t)$) of channel 2. These parameters, or taps, are then forwarded to DFE 8, to set the initial operating characteristics of the feed-forward equalizer 9 therein.

In the operation of the conventional blind equalizer function 2, update function 6 controls the operation of adaptive equalizer function 4 according to the conventional Constant Modulus Algorithm (CMA). The CMA is of the gradient descent type, and operates by minimizing a cost function such as:

$$J_{cma}=||\gamma-|y|^2|^2$$

where modulus $\gamma$ is defined as the kurtosis of the source signal $$s_k\left(\gamma = \frac{E|s|^4}{E|s|^2}\right),$$

and where y is the "soft" decision output of equalizer 4. In the case of QPSK modulation, where the amplitude of the coded signal is constant, and the phase communicates the symbol, the value of $\gamma$ is unity (from which the term "constant modulus" is derived. In this example, the minimization is referred to as "CMA2", since the cost function considers the difference of the kurtosis value and the square of the absolute value of the soft output. Other order CMA minimization (including CMA1) are also utilized in conventional blind equalization.

Update function 6 adjusts the parameters of equalization according to this CMA minimization. For the example of CMA2, the update equation may be expressed as follows:

$$f_{k+1}=f_k+\mu r_k y_k(\gamma-|y_k|^2)$$

where $\mu$ is a convergence constant between 0 and 1; as noted above, the current value of the received signal is expressed as $r_k$, while the current output of equalizer function 4 is $y_k$. Those in the art will recognize that this update expression effectively corresponds to an LMS error minimization approach.

When utilized in the equalization of a modulated signal, each output $y_k$ of equalizer function 4 represents a complex value. In the digital sense, the complex value is represented by a real portion $Y_R$ and an imaginary portion $y_I$, such that the output value $y_k=y_R+iy_I$. Accordingly, the calculation of the update equation for CMA2 minimization may be expressed as:

$$f_{k+1} - f_k = K\left(\gamma - \left|\sqrt{y_I^2 + y_R^2}\right|^2\right)$$

(K being a constant) or, for the case of CMA1:

$$f_{k+1} - f_k = K\left(\gamma - \left|\sqrt{y_I^2 + y_R^2}\right|\right)$$

In either case, the term:

$$\sqrt{y_I^2 + y_R^2}$$

must be evaluated by update function 6 in blind equalizer function 3.

As is well known in the art, the determination of square roots by way of digital processing is extremely cumbersome; the squaring of a value is also somewhat cumbersome, as it involves a multiplication. Considering that the evaluation of the term $$\sqrt{y_I^2 + y_R^2}$$

must be performed by update function 6 for each received symbol $r_k$, it is apparent that this complex arithmetic operation will constitute a significant portion of the processing required for blind equalization. When implemented by way of program instructions, for example where blind equalization function 3 is realized by a programmed digital signal processor (DSP) or other programmable device, the execution of update function 6 will thus require a significant number of machine cycles. On the other hand, the realization of update function 6 by custom logic circuitry will require a significant amount of circuitry, occupying substantial integrated circuit chip area and thus being quite costly.

It is therefore desirable to utilize an appropriate approximation of the determination of the magnitude of point $y_k$ in complex space.

Numerous digital numerical approximations to the determination of the magnitude of a point in complex space (i.e., approximations to the root of the sum of squares of two values) are known in the art. Examples of such approximations are described in U.S. Pat. No. 5,367,702, commonly assigned herewith, and incorporated. herein by this reference. Other known digital approximations to the square root of the sum of two squares are described in U.S. Pat. No. 3,829,671, U.S. Pat. No. 3,858,036, U.S. Pat. No. 3,922,540, and U.S. Pat. No. 5,459,683. However, the selection of a suitable approximation for use in the update process in blind equalization is not readily apparent. This is because of the risk of accumulated error in the update process, such that the equalization parameters $f_k$ for equalizer function 4 diverges, rather than converges upon the appropriate equalization state. The risk of such divergence is apparent from the update equation itself, considering that the new parameter $f_{k+1}$ depends upon its previous value $f_k$.

BRIEF SUMMARY OF THE INVENTION

It is therefore an object of the present invention to provide a method of performing the update function in blind equalization which uses an approximation to the determination of the magnitude of a digitally represented symbol value in complex space.

It is a further object of the present invention to provide such a method in which the approximation error does not accumulate over repeated updating.

It is a further object of the present invention to provide such a method that may be efficiently implemented either in program instructions or in logic circuitry.

Other objects and advantages of the present invention will be apparent to those of ordinary skill in the art having reference to the following specification together with its drawings.

The present invention may be implemented in a blind equalization function, such as may be utilized on the receive side of a cable modem, realized either as relatively simple logic circuitry, or as simple program instructions. The blind equalization function includes an adaptive equalizer, the parameters of which are updated by an update function according to the current output of the adaptive equalizer and the corresponding received symbol value. The update function evaluates an error approximation based upon determinations of the maximum of the real and imaginary components of the symbol output from the adaptive equalizer, and of the minimum of the real and imaginary components, with such determinations used to derive the subtrahend to be subtracted from the modulus to derive the error estimate.

BRIEF DESCRIPTION OF THE SEVERAL VIEWS OF THE DRAWING

FIG. 5 is an electrical diagram, in block form, of the equalizer in the cable modem of FIG. 4, constructed according to the preferred embodiments of the invention.

FIG. 6 is a flow diagram illustrating the operation of the equalizer of FIG. 5 in performing blind equalization according to the preferred embodiments of the invention.

FIGS. 7a and 7b are flow diagrams illustrating the error estimation process used in the blind equalization process of FIG. 6, according to the first and second preferred embodiments of the invention, respectively.

DETAILED DESCRIPTION OF THE INVENTION

The preferred embodiments of the present invention will be described hereinbelow in the context of a cable modem network utilized for data communications, as it is believed, in connection with the present invention, that the improved blind equalization process described herein is especially advantageous in such systems. It is contemplated, however, that the present invention may also be advantageously used in connection with other blind equalization applications, such as those used in conventional modem communications, data communication between computing systems taking place over internal or external networks, and the like. Those skilled in the art and having reference to this specification will be readily able to recognize such other uses of the blind equalization described herein; it is contemplated that such alternative uses of the present invention will be within the scope of the claims presented hereinbelow.

Figure 2:
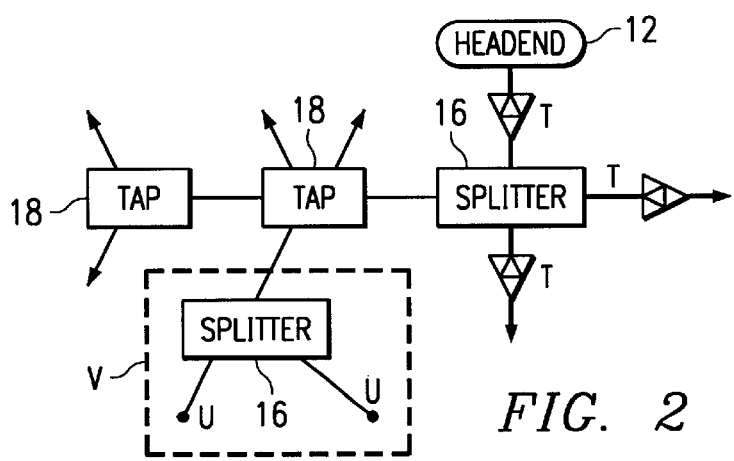
FIG. 2 is a system topology diagram of a cable television (CATV) network into which the preferred embodiments of the invention may be implemented.

FIG. 2 illustrates an example of a system topology of a cable television (CATV) network into which the present invention may be implemented. As illustrated in FIG. 2, headend 12 is a cable company office from which the CATV programming is forwarded to the cable subscribers, illustrated in FIG. 2 as users U; as such, headend 12 will receive video programming signals by way of satellite transmission, land line, or the like. Headend 12 forwards these signals to users U by way of a "tree" network that includes trunks T, splitters 16, and taps 18. As illustrated in FIG. 2, splitters 16 may be located on either side of taps 18, such as within a locality L which may be a building or city block. The transmission medium in a network such as that illustrated in FIG. 2 is typically coaxial cable; however, in recent years, some cable systems utilize fiber optic links as bunks T, at least in part, giving rise to the so-called Hybrid Fiber Coax (HFC) infrastructure.

The system of FIG. 2 is, of course, well-suited for the unidirectional transmission of information from headend 12 to users U. As previously noted, however, CATV networks are now increasingly being used to provide users U with access to the Internet, in which case bidirectional communication is carried out. Such bidirectional communication can be readily carried out over the CATV network topology of FIG. 2, by the use of cable modems at the locations of users U. The coaxial cable or HFC infrastructure is readily able to carry high data rate transmissions, such as useful in Internet access and use, especially compared against conventional telephone networks that utilize twisted-pair conductors as the transmission facility.

Figure 3:
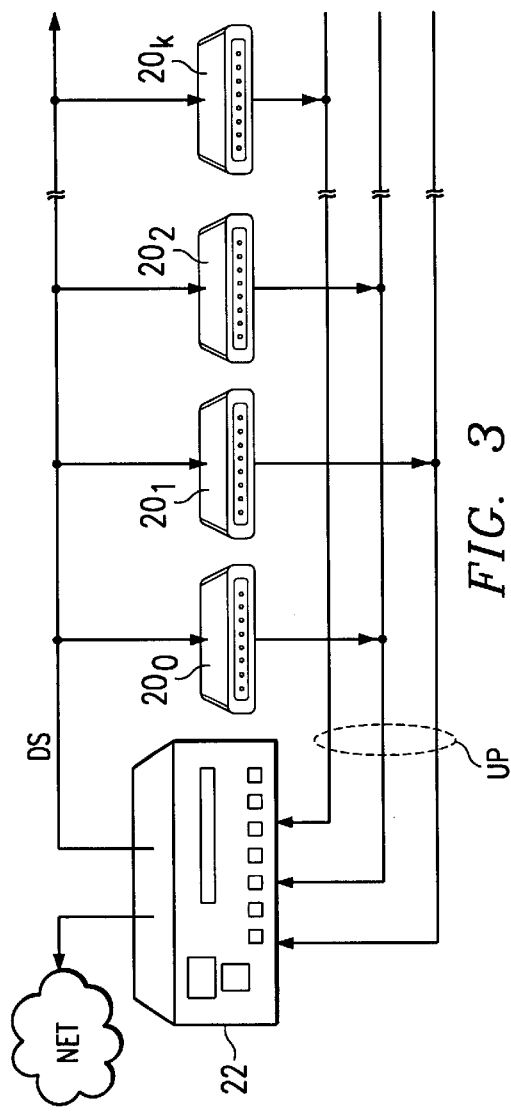
FIG. 3 is a logical topology diagram of a cable modem network in the system of FIG. 2, and into which the preferred embodiments of the invention may be implemented.

FIG. 3 illustrates an example of the logical topology of a cable modem network, such as may be implemented into the system topology exemplified in FIG.2. As illustrated in FIG. 3, central office modem 22, which is located at the headend 12 in the system topology of FIG. 2, is connected on one side to the Internet, and on another side to cable modems $20_0$ through $20_k$ at user locations (such as users U in the system topology of FIG. 2). Each cable modem 20 is, of course, connected to a user or client computer system (not shown) at which data is displayed and entered. Downstream path DS carries the transmission of Internet and other computer readable data from central office modem 22 to cable modems 20, as shown in FIG. 3. Each of cable modems 20 is assigned an individual address, such that it can detect its own downstream data upon downstream path DS for receipt, and filter out the data intended for the others of cable modems 20; as such, downstream data is effectively broadcast over downstream path DS. Central office modem 22 is the exclusive transmitter of data to cable modems 20 (i.e., cable modems 20 will not communicate with one another directly, but instead may only communicate with one another via central office modem 22 or the Internet itself), and as such no downstream media access control (MAC) mechanism is required in this logical arrangement.

Each of cable modems 20 communicate with central office modem 22 over a number of upstream channels, indicated collectively as upstream path UP in FIG. 3. Each upstream channel within path UP may be shared by multiple cable modems 20, and as such central office modem 22 will include functionality to allocate upstream channels, and slots therewith; additionally, because multiple upstream channels are received by central office modem 22 over upstream path UP, a media access control (MAC) mechanism is provided therewithin. The MAC operation, particularly in allocating upstream communication slots and managing upstream timing, utilized in the network of FIG. 3 is described in Perkins and Gatherer, "Two-way broadband CATV-HFC networks: state of the art and future trends", *Computer Networks*, Vol. 31 (Elsevier Science B.V., 1999), pp. 313–3216, incorporated herein by this reference.

As is well known in the art, communications between cable modem 20 at user location U and central office modem 22 at headend 12 are typically initiated by a request from cable modem 20 that is acknowledged by central office modem 22. In the initialization of modem transmission in such a network according to current protocols, as is well known in the art, no fixed training sequence is issued by central office modem 22 for purposes of the setting of the appropriate filter parameters within cable modem 20 to compensate for channel effects. Rather, cable modem 20 is expected to perform "blind equalization" on the datastream forwarded thereto by central office modem 22, so that channel effects are compensated to at least a sufficient extent to permit higher precision equalization, as may be implemented by way of decision feedback equalization, to then be utilized.

Figure 4:
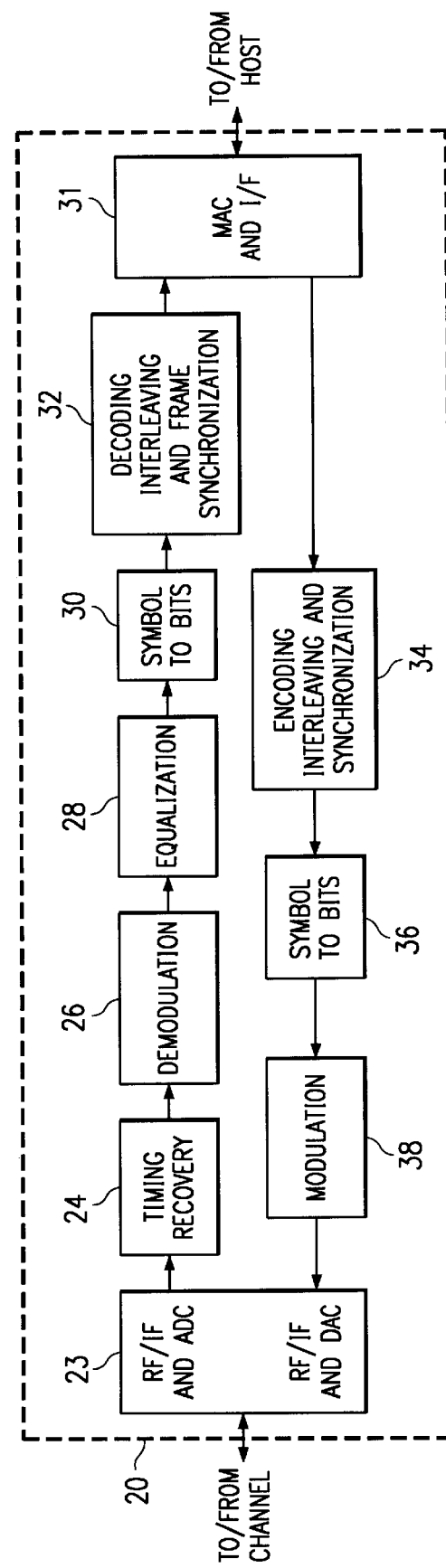
FIG. 4 is an electrical diagram, in block form, of a cable modem constructed according to the preferred embodiments of the invention.

Referring now to FIG. 4, the construction of cable modem 20 according to the preferred embodiment of the present invention will now be described in detail. It is to be understood that the present invention may be readily implemented into cable modems of any one of many architectures, and that as such, cable modem 20 illustrated in FIG. 4 is presented by way of example only. Further examples of cable modem architectures, in which the present invention may be readily realized, are described in McGoldrick, "Super chip is the first to get the cable modem down to size", *Electronic Design June*, 1997); Goldberg, *"IC opens 500-channel frontier to cable systems"*, *Electronic Design* (November, 1994); VES4613 64/256 QAM Subsystem product brochure (VLSI Tecnlologies, May 1995); Samuelli, "Update on Silicon IC Technology for Downstream 64-QAM Transmission," IEEE Project 802.14 Cable TV Protocol Working Group, Document #IEEE 802.14-96/095 (March, 1995).

Additionally, while the example of FIG. 4 illustrates the functional blocks within cable modem 20, it is contemplated that cable modem 20 according to the preferred embodiment of the invention is preferably realized, in large part, by way of a digital signal processor (DSP) integrated circuit. Examples of high performance DSP integrated circuits that are particularly well suited for use in cable modem 20 include the TMS320C6x digital signal processor family available from Texas Instruments Incorporated. In such a realization, several of the functional blocks of cable modem 20 that are illustrated in FIG. 4 will thus not correspond to separate hardware circuits, but will instead correspond to functions or routines performed by the DSP integrated circuit, under the control of program instructions. In such an arrangement, the digital functions described herein will typically be performed by the DSP, with special function integrated circuits typically used to perform the analog and mixed signal functions, such as those involved in the modulation and demodulation of the signals, signal conversion between the analog and digital domains, and the like. For purposes of clarity, the following description of cable modem 20 will be in terms of the functional blocks of FIG. 4.

In the example of FIG. 4, cable modem 20 interfaces with the CATV network by way of radio frequency (RF) interface 23. RF interface 23 effectively operates as a splitter, and is thus in communication with both the transmit and receive sides of cable modem 20. In this regard, RF interface 23 includes an analog-to-digital conversion (ADC) function, by way of which the incoming analog signals are sampled and digitized for processing by the receive side of cable modem 20. On this receive side, timing recovery function 24 recovers a clock signal from the incoming signals, relative to a high-precision external crystal oscillator clock in the conventional manner. Demodulation function 26 operates to demodulate the received signal, which is contemplated to be in some type of phase-amplitude modulation PAM) form, thus providing a sequence of digital words to equalization function 28.

As noted above, equalization function 28 filters this symbol sequence to compensate for signal distortion introduced by the communications channel. The construction of equalization function 28, according to the preferred embodiments of the invention, will be described in further detail hereinbelow. As noted above, and will also become apparent from the description below, the digital filter applied by equalization function 28 is set by way of blind equalization during the initialization of the communications session.

Following equalization function 28, function 30 deframes the filtered symbols deframed into a bitstream, for application to decoding function 24. Decoding and de interleaving function 32 reverses such encoding and interleaving that was used in the transmission of the signal. For example, function 32 may include Viterbi decoding, Reed-Solomon decoding operation, and inverse convolutional interleaving. The decoded output from function 32 is forwarded to media access control MAC and interface function 31, which performs the appropriate=MAC functions upon the received signal and interfaces with the host computer of cable modem 20.

For the sake of completeness, the transmit side of cable modem 20 will be briefly described in detail relative to FIG. 4. As illustrated in FIG. 4, MAC and interface function 31 presents to encoder 34 the digital data that is to be transmitted by cable modem 20 over the CATV network, Encoder 34 encodes the data words into the desired phase and amplitude modulated constellations, according to the particular protocol; for example, a punctured convolutional code may be applied to the data words, to provide good noise immunity. The encoded c points are then preferably subjected to convolutional interleaving according to the conventional technique, to disperse the effects of any burst error events over the communicated datastream. Encoding function may also synchronize the bitstream at a frequency that is derived from the downstream bitstream from headend 12, so that the upstream communication is synchronized with a master dock at central office modem 22. Symbol to bit translation function 36 sequences the encoded data into the appropriate data words to be modulated by QAM modulator function 38, which converts the coded constellation points generated by encoder 34 into in-phase and quadrature (i.e., complex) values, which are converted into analog signals of the appropriate amplitude and phase signals by RF interface 23, which includes the appropriate analog-to-digital conversion (ADC) function therein. The upstream signal is then applied to the CATV network by cable modem 20, as illustrated in the exemplary system arrangement of FIG. 3.

Figure 1:
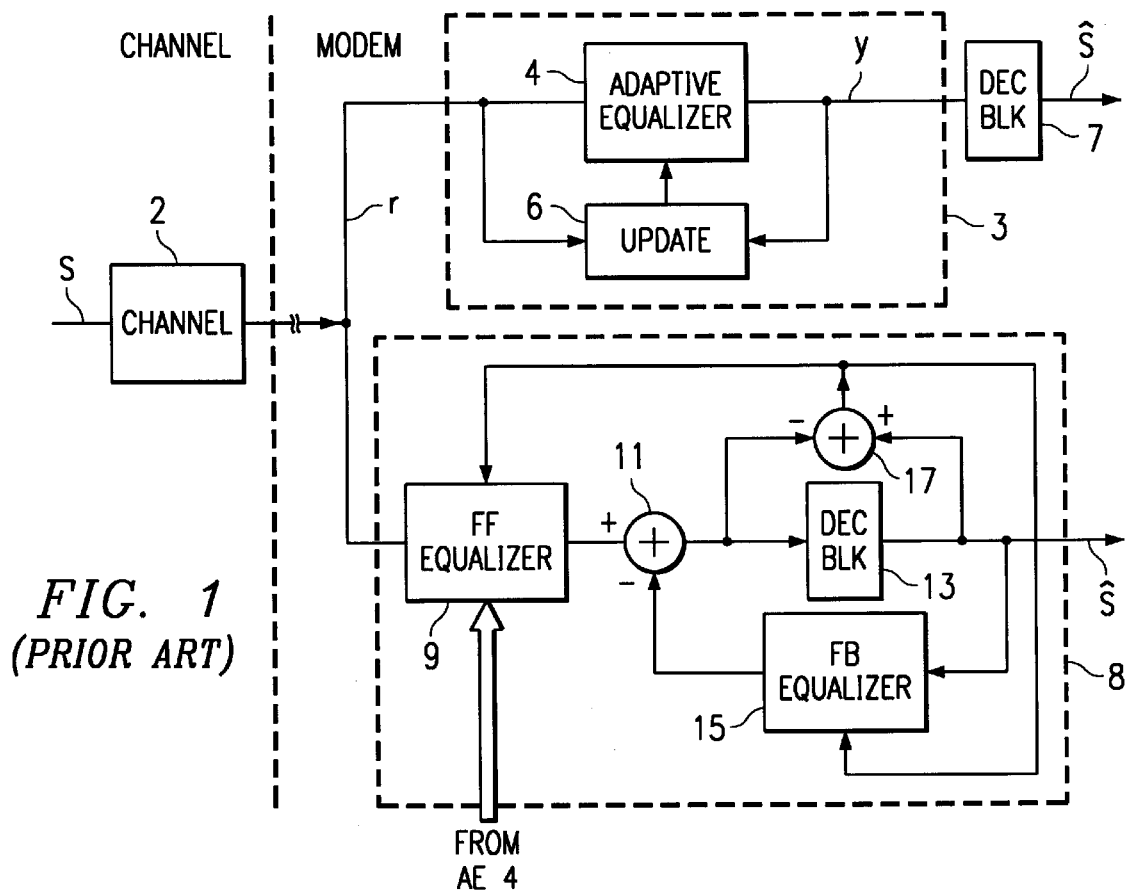
FIG. 1 is an electrical diagram, in block form, of blind equalization and decision feedback equalization functions in combination in a conventional receiver.

Referring now to FIG. 5, the construction and operation of equalization function 28 according to the preferred embodiments of the invention will now be described in detail. As in the conventional equalizer described hereinabove relative to FIG. 1, equalization function 28 includes the parallel arrangement of blind equalizer 40 and decision feedback equalizer (DFE) 48; in this construction, blind equalizer 40 operates initially to effectively compensate for the transmission channel to the extent necessary that DFE 48 is able to then precisely compensate for the channel effects. It is contemplated that blind equalizer 40 and DFE 48 may be implemented in various ways according to the preferred embodiments of the invention, including by way of a sequence of program instructions performable by a digital signal processor (DSP), and by custom logic circuitry. It is also contemplated that, in the case that equalization function 28 is realized through custom logic, some functions such as the feed-forward equalizer path may be shared by blind equalizer 40 and DFE 48, with a controlled switching arrangement included to switch various DFE functions into the blind equalization operation. It is contemplated that those skilled in the art having reference to this specification will be readily able to realize equalization function 28 according to the preferred embodiments of the invention in these, and other, ways, without departing from the scope of the invention as hereinafter claimed.

As noted above, one may refer to the transmitted signal (in an undistorted form), as a time domain signal s(t). In FIG. 5, signal $r_k$ serves as the input to equalization function 28, from demodulator 26 as shown in FIG. 4, and is in the form of a stream of digital symbols corresponding to the transmitted signal s(t), as distorted by the response of the transmission channel, and as sampled and converted from analog into digital by interface function 23 of cable modem 20. Received signal $r_k$ is controlled by switch 41 to be forwarded either to blind equalizer 40 or DFE 48, depending upon the stage of the communications session, as described above.

Adaptive equalizer 44 in blind equalizer 40 receives signal $r_k$ from switch 41 during the initial portion of the communications session. Adaptive equalizer 44 is preferably realized by a finite impulse response (FIR) digital filter, for example by way of a tapped delay line with tap weights corresponding to equalization coefficients of the filter. The equalization coefficients are updated, in blind equalizer 48, by approximating update function 42 in a manner according to the preferred embodiments of the invention which will described in detail below. Signal $y_k$ at the output of adaptive equalizer 44 is applied to approximating update function 42.

Decision block 47 also receives output signal $y_k$ and, according to a conventional slicing algorithm, determines detected symbols $\hat{s}_k$ to the remainder of cable modem 20.

Decision feedback equalizer (DFE) 48 is constructed and operates in similar manner as DFE function 8 described above relative to the conventional modem of FIG. 1. In brief, DFE 48 includes feed-forward equalizer 59 which is a compensating FIR filter that is applied to the received signal $r_k$ when selected by switch 41, in combination with feedback equalizer 55 which is also preferably realized as an FIR filter. The output of feedback equalizer 55 is subtracted from the output of feed-forward equalizer 49 by adder 51, with the resulting difference applied to decision block 53, which applies the appropriate slicing algorithm to generate detected symbols $\hat{s}_k$. The equalizer coefficients of feedback equalizer 55 and feed-forward equalizer 59 are updated according to the comparison, performed by adder 57, of the input to and output from decision block 53.

As in the conventional arrangement described above, blind equalizer 40 operates during the initial portion of the transmission, with the filter parameters (or "taps", in the digital filter sense) of adaptive equalizer 44 converging upon an approximate compensation for the distortion effects (i.e., response h(t)) of the transmission channel. This convergence occurs due to the operation of approximating update function 42, according to the preferred embodiments of the invention, which determines the equalizer coefficients by way of the Constant Modulus Algorithm, but using approximations to the update equation. The resulting parameters, in the form of FIR tap weights, are then forwarded to DFE 48, to set the initial operating characteristics of the feed-forward equalizer 59 therein.

As noted above, the exact form for the update process in the CMA cannot be efficiently implemented, either as a sequence of program instructions or as custom logic circuitry, due to its inclusion of both the squaring of parameters and also the square root of the sum of these squares, in order to evaluate the error term e as follows:

$$e = \gamma - \left|\sqrt{y_I^2 + y_R^2}\right|^j$$

where $\gamma$ is the kurfosis of the expected value of the input signal, and where $y_R$, $y_I$ are the real and imaginary components, respectively, of the symbol $y_k$ after the adaptive equalizer. The exponent j refers to the order of the particular CMA implementation being used (i.e., j=1 for CMA1, j=2 for CMA2, etc.). While the following description will be presented for the case of CMA1 for the sake of clarity, it is of course to be understood that the derivation of the error term e for the appropriate order of the CMA will be readily determined by the application of the corresponding exponent j.

According to a first preferred embodiment of the invention, approximating update function 42 uses a numerical approximation to determine the magnitude of the symbol value $y_k$ at the output of adaptive equalizer 44. Specifically, in this first embodiment of the invention, approximating update function 42 determines the error e using the approximation:

$$e = \gamma - (\max(|y_I|, |y_R|) + \tfrac{1}{2}\min(|y_I|, |y_R|))$$

This error approximation uses a known approximation for the magnitude of a complex number $y_R + iy_I$ (i.e., for the square root of the sum of two squares), for example as described in U.S. Pat. No. 3,829,671 and in U.S. Pat. No.

3,858,036. This approximation is one of several such approximations for this magnitude. According to the present invention, however, it has been discovered that this approximation is beneficial when used to update the adaptive equalizer 44 in blind equalizer 40, because that any error resulting from the approximation will not accumulate over multiple samples, thus permitting blind equalizer 40 to properly converge upon an accurate set of equalization coefficients.

Additionally, the error approximation according to this first preferred embodiment of the present invention provides a high level of efficiency in its evaluation, thus greatly facilitating the blind equalization process, an example of which will now be described relative to FIG. 6, in combination with FIG. 5.

The blind equalization process according to this first preferred embodiment of the invention begins with process 60, in which blind equalizer 40 receives an incoming symbol $r_k$. Symbol $r_k$ is applied to adaptive equalizer 44 which, in process 62, applies an FIR filter to symbol $r_k$ according to the current state of its equalizer coefficients f. As described above, adaptive equalizer 44 is preferably implemented by way of a multiple-tap delay line, with the equalizer coefficients f included as the tap weights from each tap prior to the output summation; these equalizer coefficients f have values set in the prior passes through the blind equalization process. Output symbol $y_k$ from adaptive equalizer 44 is forwarded to decision block 47, which performs process 64 to generate the current output symbol $\hat{s}_k$ to the remainder of cable modem 20, using a conventional slicing algorithm. As noted above, each of symbols $r_k$, $y_k$, $\hat{s}_k$ (as well as other intermediate values) are complex values, communicated by way of their real and imaginary components (e.g., where $r_k=r_R+ir_I$, real and imaginary components $r_R$, $r_I$ will be processed in parallel through blind equalizer 40).

Output symbol $y_k$ from adaptive equalizer 44 is also forwarded to approximating update function 42, as illustrated in FIG. 5. Approximating update function 42 is for generating an updated equalizer coefficient $f_{k+1}$ in response to each received symbol $r_k$, by estimating error term $$e = \gamma - \left|\sqrt{y_I^2 + y_R^2}\right|$$

in process 66 according to the first preferred embodiment of the invention, with this error estimate used to generate the new equalizer coefficient $f_{k+1}$ in process 68. Referring now to FIG. 7a, the estimation of the error term $$e = \gamma - \left|\sqrt{y_I^2 + y_R^2}\right|$$

according to the first preferred embodiment of the present invention will now be described in detail.

Error estimation process 66 according to the first preferred embodiment of the present invention is illustrated in FIG. 7a relative to a process flow diagram. As such, it is contemplated that those skilled in the art having reference to this specification will be readily able to implement process 66 by way of a sequence of program instructions, executable by a microprocessor, DSP, or other programmable logic device. Given the nature of the operations used to execute process 66, however, it is also contemplated that those skilled in the art having reference to this specification will also readily able to realize process 66 by way of custom logic, through the use of conventional shifters, adders, registers, and the like. As such, no detailed description of the construction of such custom logic will be provided herein, it being understood that such construction is well within the skill of the artisan.

Error estimation process 66 begins, in process 70, with approximating update function 42 receiving real and imaginary components $y_R$, $y_I$ of output signal $y_k$ from adaptive equalizer 44, in the form of digital data words. In process 71, the absolute values of real and imaginary components $y_R$, $y_I$ are compared with one another. In the event that the absolute value of imaginary component $y_R$ is greater than or equal to the absolute value of real component $y_R$ (decision 71 is YES), process 72a is performed to set operand MIN to the absolute value of real component $y_R$ and to set operand MAX to the absolute value of imaginary component $y_I$. Conversely, if the absolute value of real component $y_R$ is greater than the absolute value of imaginary component $y_I$ (decision 71 is NO), process 72b is performed to set operand MIN to the absolute value of imaginary component $y_I$ and to set operand MAX to the absolute value of real component $y_R$.

Upon completion of the appropriate one of processes 72a, 72b, control passes to process 74. In process 74, operand MIN is divided by two which, considering the digital nature of blind equalizer 40, is preferably performed by way of a one-bit shift of operand MIN to the right, as may be readily executed (either in software or hardware) by approximating update function 42. In process 76, the current value of operand MAX and operand MIN (after the shifting of process 74) are added; in process 78, approximating update function 42 subtracts this sum from the modulus value γ. Modulus value γ is preferably set to a constant, as it depends solely upon the type of modulation used in the transmission. The error estimate e is thus generated as the difference from process 78, corresponding to the above-described estimate:

$$e=\gamma-(\max(|y_I|,|y_R|)+\tfrac{1}{2}\min(|y_I|,|y_R|))$$

As noted above, this estimate is presented for the case of CMA1 equalization. For higher order CMA, the estimated subtrahend will, of course, be raised to the appropriate power prior to the subtraction.

As evident from the foregoing description of process 66, the error estimation may be generated very efficiently, according to this first preferred embodiment of the present invention. One can readily determine, from the exemplary implementation of FIG. 7a, that the error may be determined by three additions (one each for processes 71, 76, 78), one shift (process 72a or 72b), and the corresponding load and store operations for the intermediate results. These extremely low processing demands are much more efficient than those required to perform the square root of the sum of the squares of the component values $y_I$, $y_R$, as necessary according to conventional approaches that utilize the exact form of the error evaluation.

Referring back to FIG. 6, approximating update function 42 next performs process 68 to determine the next equalization coefficient $f_{k+1}$, using error term e, complex received symbol $r_k$, and the current complex output symbol $y_k$, according to the conventional CMA update expression. For the example of CMA2, this update expression is:

$$f_{k+1}=f_k+\mu r_k y_k^* e$$

where μ is the convergence constant conventionally determined. The corresponding update expressions for other CMA orders (e.g., CMA1) are well-known. Following generation of the next equalization coefficient $f_{k+1}$, blind equalizer 40 is prepared for the receipt and processing of the next received symbol $r_{k+1}$ (following the appropriate delay 65), using the updated FIR filter.

The operation of blind equalizer 40 continues over a number of received symbols, until either some convergence criteria is met or until a preselected duration of the communications session has elapsed. At this point, cable modem 10 can assume that adequate compensation for channel effects has been derived by blind equalizer 40, such that DFE 48 may now take over the compensation process, further improving the accuracy of the transmission (and, perhaps, its data rate). Referring back to FIG. 5, switch 41 may then forward received symbols to DFE 48 from demodulator 26, following which the communication session continues.

The approximation for the error evaluation in process 66 according to this first preferred embodiment of the invention is, as discussed above, quite efficient in terms of execution or circuit complexity. In addition, it has been observed, through simulation, that the error approximation according to this first preferred embodiment of the invention provides for suitable convergence of adaptive equalizer 44, as will now be discussed relative to FIGS. 8a through 8c.

Figure 8A:
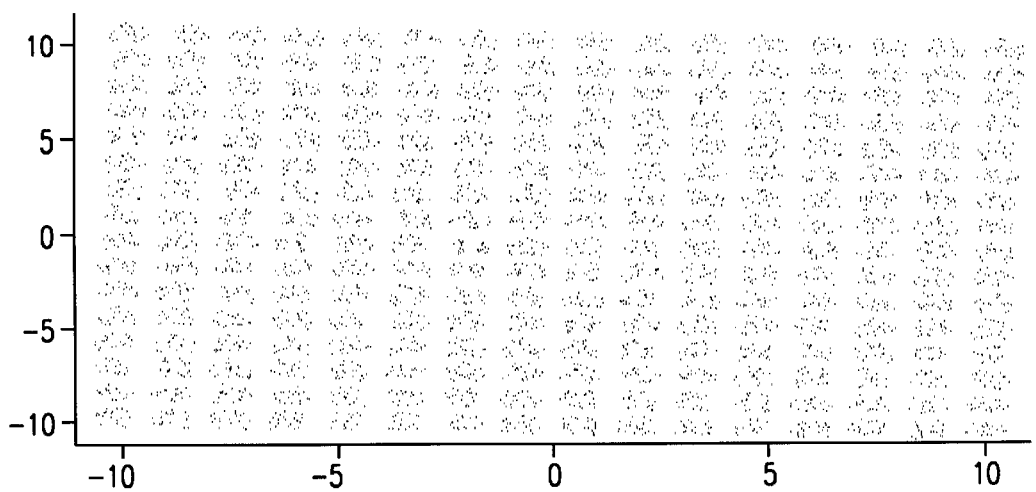
FIGS. 8a through 8c are scatter plots respectively illustrating simulated constellations of a modulated signal as transmitted, as received over a simulated transmission channel, and after blind equalization according to the first preferred embodiment of the invention.
Figure 8B:
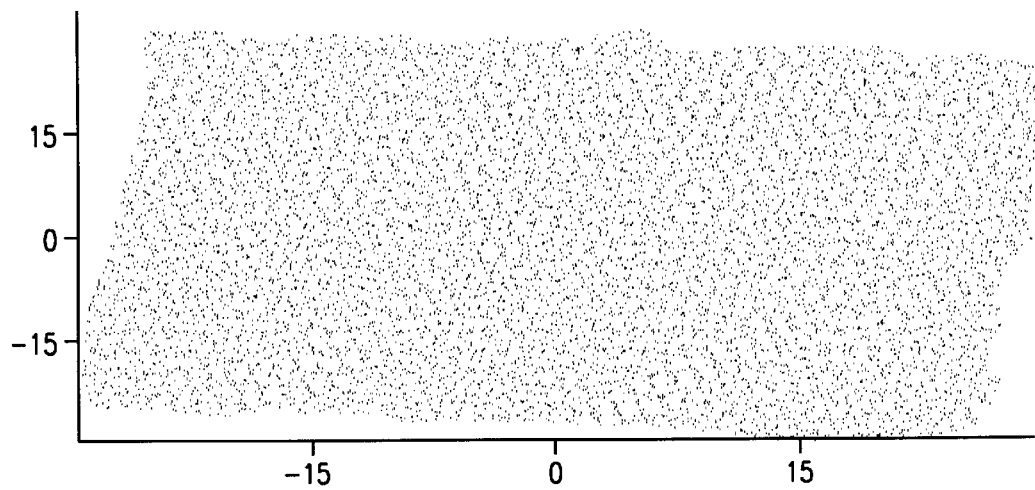

FIG. 8a is a scatter plot illustrating the constellation of a simulated QAM modulated signal, as to be transmitted over a simulated cable modem transmission channel. As evident from FIG. 8a, some amount of noise is included in this signal, but the individual QAM points in the constellation are identifiable, such that the modulated symbol values can be retrieved therefrom. FIG. 8b is a scatter plot illustrating the constellation of FIG. 8a after its simulated transmission. As evident from FIG. 8b, the simulated transmission channel distorts the modulated signal to a significant extent, such that the particular constellation points cannot be readily distinguished from one another without compensation for the channel effects. Those skilled in the art will recognize that conventional decision feedback equalization would not be successful if applied to a modulated signal having the characteristics of FIG. 8b.

Figure 8C:
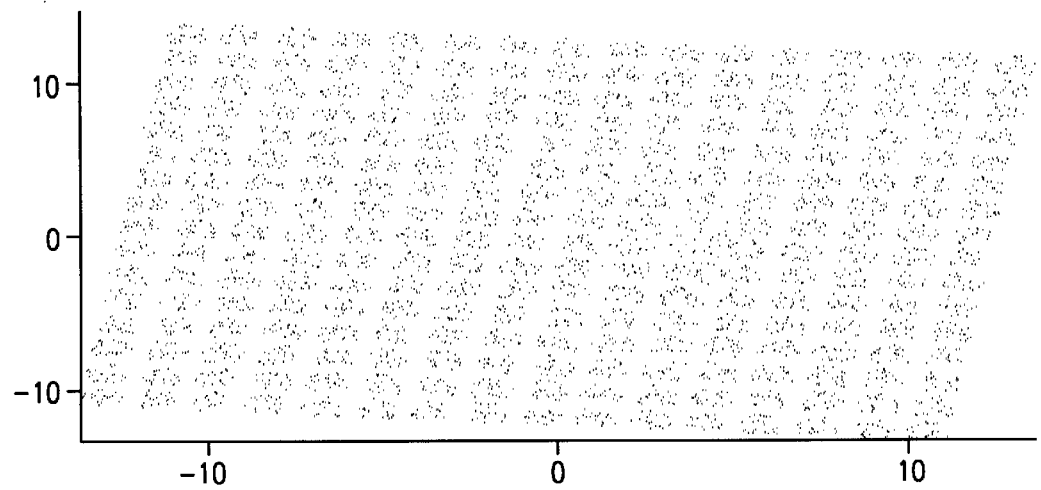

FIG. 8c illustrates the result of the application of blind equalization according to the first preferred embodiment of the invention to the simulated modulated signal represented by FIG. 8b. As evident from FIG. 8c, the blind equalization process according to this first preferred embodiment of the invention compensates for the channel effects to such an extent that the individual symbol points may be distinguished from one another. While some amount of noise, and phase distortion (evident by the tilt in the parallelogram of the constellation) remains present in the constellation of FIG. 8c, those skilled in the art will recognize that the application of conventional decision feedback equalization and phase compensation to the constellation of FIG. 8c will render useable data. Indeed, based on other simulations, the performance illustrated in FIG. 8c for the blind equalization process according to this first preferred embodiment of the invention compares favorably to conventional blind equalization in which the exact error term is used. As such, the significant efficiencies provided by the blind equalization according to the first preferred embodiment of the invention may be attained, while still providing equalization coefficients that successfully converge to a useable state.

Figure 7B:
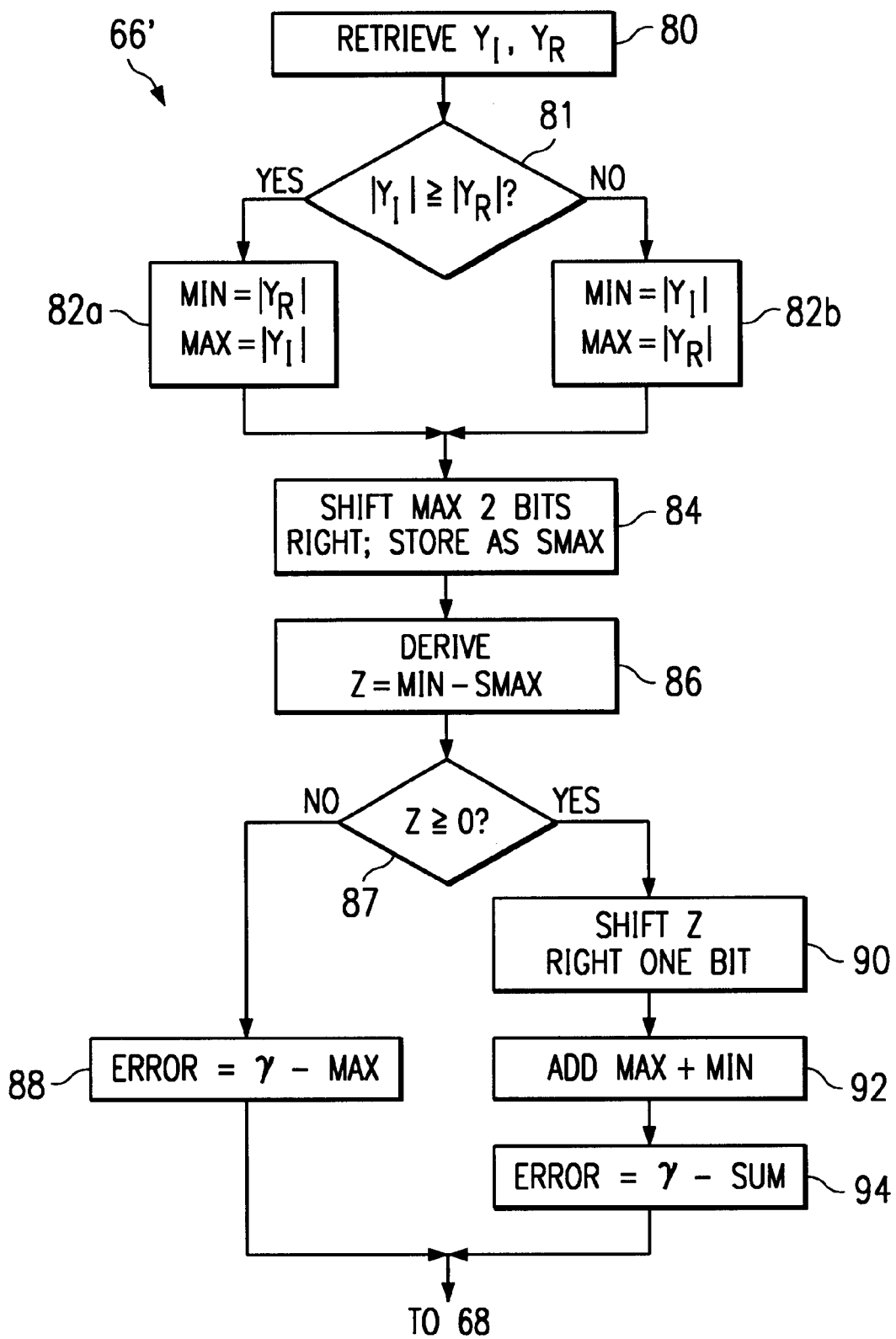

Referring now to FIG. 7b, the operation of blind equalizer 40 according to a second preferred embodiment of the invention will now be described. This second preferred embodiment of the invention utilizes a second approximation to the evaluation of the error term in the updating of the coefficients of adaptive equalizer 44. As noted above, the exact form of the error term e is as follows:

$$e = \gamma - \left|\sqrt{y_I^2 + y_R^2}\right|^j$$

According to this second preferred embodiment of the invention, the approximation of error term e (for the case of CMA1) is as follows:

$$e = \begin{cases} \gamma - \max(|y_I|, |y_R|), & \text{for } z < 0 \\ \gamma - \left(\max(|y_I|, |y_R|) + \dfrac{z}{2}\right), & \text{for } z \geq 0 \end{cases}$$

where:

$$z = \min(|y_I|, |y_R|) - \frac{\max(|y_I|, |y_R|)}{4}$$

Referring now to FIG. 7b, error estimation process 66' according to the second preferred embodiment of the present invention, utilizing this second approximation, will now be described. Process 66' is performed at the same stage in the overall blind equalization process as process 66 (see FIG. 6). As noted above, it is contemplated that those skilled in the art having reference to this specification will also be readily able to implement process 66' by way of a sequence of program instructions, executable by a microprocessor, DSP, or other programmable logic device, as well as by way of custom logic, through the use of conventional shifters, adders, registers, and the like.

Process 80 initiates error estimation process 66' with the receipt or retrieval, by approximating update function 42, of digital words corresponding to the real and imaginary components $y_R$, $y_I$ of output signal $y_k$ from adaptive equalizer 44. In process 81, the absolute values of real and imaginary components $y_R$, $y_I$ are compared with one another. If imaginary component $y_I$ is greater than or equal to the absolute value of real component $y_R$ (decision 81 is YES), process 82a sets operand MIN to the absolute value of real component $y_R$ and operand MAX to the absolute value of imaginary component $y_I$; if the absolute value of real component $y_R$ is greater than the absolute value of imaginary component $y_I$ (decision 81 is NO), process 82b sets operand MIN to the absolute value of imaginary component $y_I$ and operand MAX to the absolute value of real component $y_R$.

Upon completion of the appropriate one of processes 82a, 82b, control passes to process 84, in which operand MAX is divided by four. As described above, since blind equalizer 40 is a digital function, process 84 may be readily performed by way of a two-bit shift of operand MAX. The shifted operand is then stored by approximating update function 42 in a register or other store as operand SMAX, considering that operand MAX (in its unshifted value) is also needed later. Operand Z is then evaluated in process 86 for the current symbol, by subtracting the value of operand SMAX from the value of operand MIN. In decision 87, operand Z is compared against zero. As is known in the art, if this blind equalization process is realized as instruction code in a programmable device, the comparison of decision 87 may be executing simply by testing a "negative" flag in a control register.

Referring to the above description of the approximation used in this second preferred embodiment of the invention, in the event that operand Z is less than zero (decision 87 is NO), control passes to process 88 for determination of the error term. In process 88, approximating update function 42 evaluates the error term as simply the difference between modulus γ and the value of operand MAX (for CMA1); following this evaluation process 88, control is then passed to process 68 for completion of the update process for the current symbol. As noted above, for higher order CMA, the estimated subtrahend will be raised to the appropriate power prior to the subtraction of process 88.

If the value of operand Z is greater than or equal to zero (decision 87 is YES), control passes to process 90, for evaluation of the other alternative expression of the error term. In process 90, operand Z is divided by two, by way of a right shift by one bit position. Process 92 is then executed to add the shifted value of operand Z to the value of operand MAX; this sum (raised to the appropriate power, if necessary) is then subtracted from the value of modulus γ in process 94 to derive the error term. Control then passes to process 68 for completion of the coefficient update process (FIG. 6).

It has been observed through simulation, in connection with the present invention, that the estimated error evaluation according to this second preferred embodiment of the invention converges upon the appropriate equalization coefficients better than the method using the estimate of the first preferred embodiment of the invention. This improved accuracy and convergence is obtained at a cost of slightly more complex processing or circuitry, according to this second embodiment of the invention, considering that an additional comparison (process 87) is necessary in every pass through process 66', and that still an additional shift (process 90) and addition process 92) is required for many instances of process 66' (i.e., those in which the greater of the two components is less than four times as large as the lesser). However, the complexity of process 66according to this second embodiment of the invention is still much reduced from the exact evaluation form for the error, at little cost in accuracy or convergence.

According to the present invention, therefore, significant efficiency in the blind equalization process is provided by the preferred embodiments of the present invention, without degrading the convergence of equalization coefficients upon proper compensation It is therefore contemplated that the present invention will be beneficial in many applications, including data communications using cable modems and other modulation approaches, as well as other applications in which blind equalization may be performed.

While the present invention has: been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of setting equalization coefficients for data signals received over a communications channel, comprising the steps of:

receiving a data symbol from the communications channel;

applying an equalizer filter to the received data symbol to produce an output symbol having real and imaginary components;

generating an error estimate for the output symbol by performing the steps of:

determining the minimum and maximum of the absolute value of the real and imaginary components of the output symbol;

generating a subtrahend using the determined minimum and maximum; and subtracting the subtrahend from a modulus value to generate an error estimate;

updating an equalization coefficient for the equalizer filter from a combination of the received data symbol, the error estimate, and the output symbol; and repeating the receiving, applying, and updating steps for a plurality of received data symbols.

2. The method of claim 1, wherein the step of generating a subtrahend comprises:

dividing the determined minimum by two; and adding the determined maximum and divided determined minimum.

3. The method of claim 2, wherein the step of generating a subtrahend further comprises:

raising the sum of the determined maximum and divided determined minimum to a selected power to produce the subtrahend.

4. The method of claim 3, wherein the dividing step comprises shifting a data word representing the determined minimum.

5. A method of setting equalization coefficients for data signals received over a communications channel, comprising the steps of:

receiving a data symbol from the communications channel;

applying an equalizer filter to the received data symbol to produce an output symbol having real and imaginary components;

generating an error estimate for the output symbol by performing the steps of:

determining the minimum and maximum of the absolute value of the real and imaginary components of the output symbol;

generating a subtrahend by:

dividing the determined maximum by four;

generating a difference operand corresponding to the determined minimum minus the divided determined maximum;

responsive to the difference operand being less than zero, generating a subtrahend corresponding to the determined maximum; and responsive to the difference operand being greater than or equal to zero, performing the operations of:

dividing the difference operand by two;

generating a subtrahend corresponding to a sum of the divided difference operand and the determined maximum; and subtracting the subtrahend from a modulus value to generate an error estimate;

updating an equalization coefficient for the equalizer filter from a combination of the received data symbol, the error estimate, and the output symbol; and repeating the receiving, applying, and updating steps for a plurality of received data symbols.

6. The method of claim 5, wherein the step of generating a subtrahend corresponding to the determined maximum further comprises:

raising the determined maximum to a selected power; and wherein the step of generating a subtrahend corresponding to a sum of the divided difference operand and the determined maximum further comprises:

raising the sum of the divided difference operand and the determined maximum to a selected power.

7. The method of claim 6, wherein the dividing step comprises shifting a data word by a selected number of bit positions.

8. The method of claim 1, wherein the repeating step is performed for a selected plurality of received data symbols; and further comprising:
  then forwarding the equalization coefficients to a decision feedback equalizer; and
  operating the decision feedback equalizer to produce detected data symbol values.

9. A communications device for receiving data communications, comprising:
  an interface for receiving modulated signals from a communications channel;
  a demodulator for demodulating the received modulated signals into digital data symbols;
  an equalizer for compensating the received modulated signals for distortion of the communications channel, comprising:
    a blind equalizer, comprising:
      an adaptive equalizer for applying a digital filter to the data symbols, having an input coupled to the demodulator, and having an output;
      an approximating update function, having an input coupled to the output of the adaptive equalizer for receiving output symbols having real and imaginary components therefrom, having an input coupled to the demodulator to receive data symbols therefrom, and having an output coupled to the adaptive equalizer, the approximating update function for updating an equalization coefficient of the adaptive equalizer, by performing the operations of:
        generating an error estimate for the output symbol by performing the steps of:
          determining the minimum and maximum of the absolute value of the real and imaginary components of the output symbol;
          generating a subtrahend using the determined minimum and maximum; and
          subtracting the subtrahend from a modulus value to generate an error estimate;
        generating an updated equalization coefficient from a combination of the received data symbol, the error estimate, and the output symbol; and
        repeating the receiving, applying, and updating steps for a plurality of received data symbols; and
    a decision block having an input coupled to the output of the adaptive equalizer, for generating a detected symbol from the output symbol.

10. The communications device of claim 9, further comprising:
  a decision feedback equalizer, having an input coupled to the demodulator.

11. The communications device of claim 10, wherein the decision feedback equalizer comprises a feed-forward equalizer, for applying a digital filter to data symbols received from the demodulator according to a plurality of equalizer coefficients;
  wherein the plurality of equalizer coefficients of the feed-forward equalizer are initialized by the plurality of equalizer coefficients of the adaptive equalizer of the blind equalizer.

12. The communications device of claim 10, wherein the approximating update function generates the subtrahend by:
  dividing the determined minimum by two; and
  adding the determined maximum and divided determined minimum; and
  raising the sum of the determined maximum and divided determined minimum to a selected power to produce the subtrahend.

13. A communications device for receiving data communications, comprising:
  an interface for receiving modulated signals from a communications channel;
  a demodulator for demodulating the received modulated signals into digital data symbols;
  an equalizer for compensating the received modulated signals for distortion of the communications channel, comprising:
    a blind equalizer, comprising:
      an adaptive equalizer for applying a digital filter to the data symbols, having an input coupled to the demodulator, and having an output;
      an approximating update function, having an input coupled to the output of the adaptive equalizer for receiving output symbols having real and imaginary components therefrom, having an input coupled to the demodulator to receive data symbols therefrom, and having an output coupled to the adaptive equalizer, the approximating update function for updating an equalization coefficient of the adaptive equalizer, by performing the operations of:
        generating an error estimate for the output symbol by performing the steps of:
          determining the minimum and maximum of the absolute value of the real and imaginary components of the output symbol;
          generating a subtrahend by dividing the determined minimum by two;
          adding the determined maximum and divided determined minimum;
          raising the sum of the determined maximum and divided determined minimum to a selected power to produce the subtrahend;
          dividing the determined maximum by four;
          generating a difference operand corresponding to the determined minimum minus the divided determined maximum;
          responsive to the difference operand being less than zero, generating a subtrahend corresponding to the determined maximum; and
          responsive to the difference operand being greater than or equal to zero, performing the operations of:
            dividing the difference operand by two; and
            generating a subtrahend corresponding to a sum of the divided difference operand and the determined maximum; and
          subtracting the subtrahend from a modulus value to generate an error estimate;
        generating an updated equalization coefficient from a combination of the received data symbol, the error estimate, and the output symbol; and
        repeating the receiving, applying, and updating steps for a plurality of received data symbols; and
    a decision block having an input coupled to the output of the adaptive equalizer, for generating a detected symbol from the output symbol; and
  a decision feedback equalizer, having an input coupled to the demodulator.

14. The communications device of claim 9, wherein the interface is for receiving modulated signals from a cable television network.

* * * * *